US009565477B2

United States Patent
Wiseman et al.

(10) Patent No.: US 9,565,477 B2
(45) Date of Patent: *Feb. 7, 2017

(54) BOOKMARKING PROSPECTIVE MEDIA CONTENT ON COMPUTER NETWORK

(71) Applicant: GOOGLE INC., Mountain View, CA (US)

(72) Inventors: Matt Wiseman, San Francisco, CA (US); Ant Oztaskent, Sutton (GB); Yaroslav Volovich, London (GB)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,545

(22) Filed: Apr. 14, 2016

(65) Prior Publication Data

US 2016/0234560 A1 Aug. 11, 2016

Related U.S. Application Data

(63) Continuation of application No. 13/668,104, filed on Nov. 2, 2012, now Pat. No. 9,317,471.

(51) Int. Cl.
*G06F 15/173* (2006.01)
*H04N 21/472* (2011.01)
(Continued)

(52) U.S. Cl.
CPC .. *H04N 21/47217* (2013.01); *G06F 15/17306* (2013.01); *G06F 17/30784* (2013.01);
(Continued)

(58) Field of Classification Search
CPC .............. G06F 15/173; G06F 15/17306; G06F 17/30884; G06F 17/30882; G06F 17/30887; H04L 61/00; G06Q 30/02; H04N 21/47217; H04N 21/482; H04N 21/6125; H04N 21/84
(Continued)

(56) References Cited

U.S. PATENT DOCUMENTS 5,907,322 A * 5/1999 Kelly ...................... H04L 29/06
348/734
6,289,346 B1 * 9/2001 Milewski .......... G06F 17/30017
(Continued)

FOREIGN PATENT DOCUMENTS

EP 2388721 A1 11/2011

OTHER PUBLICATIONS

Google Inc., International Preliminary Report on Patentability, PCT/US2013/068145, May 5, 2015, 8 pgs.
(Continued)

*Primary Examiner* — Joseph E Avellino
*Assistant Examiner* — Binod J Kunwar
(74) *Attorney, Agent, or Firm* — Morgan, Lewis & Bockius LLP

(57) ABSTRACT

Systems and methods for bookmarking prospective media content on computer network. In some implementations, a method includes: at a server system, obtaining, from a electronic device, information corresponding to a media content item; identifying the media content item, from among a plurality of media content items, in accordance with the information; creating a provisional bookmark corresponding to a first URL where the media content item is not yet available but is likely to be available within a predefined time period; and transmitting the provisional bookmark to the electronic device. The method optionally includes: after creating the provisional bookmark, in accordance with a determination that the media content item has become available at the first URL, before the predefined
(Continued)

time period: converting the provisional bookmark into a non-provisional bookmark.

20 Claims, 7 Drawing Sheets

(51) Int. Cl.
    *G06F 17/30* (2006.01)
    *H04N 21/482* (2011.01)
    *H04N 21/61* (2011.01)
    *H04N 21/84* (2011.01)

(52) U.S. Cl.
    CPC .. *G06F 17/30882* (2013.01); *G06F 17/30884* (2013.01); *G06F 17/30887* (2013.01); *H04N 21/482* (2013.01); *H04N 21/6125* (2013.01); *H04N 21/84* (2013.01)

(58) Field of Classification Search
    USPC .......................................................... 709/217
    See application file for complete search history.

(56) References Cited

U.S. PATENT DOCUMENTS

| | | | |
|---|---|---|---|
| 6,868,225 B1 | 3/2005 | Brown et al. | |
| 6,992,687 B1 | 1/2006 | Baird et al. | |
| 7,032,177 B2 * | 4/2006 | Novak | G11B 27/105 348/E7.071 |
| 7,143,353 B2 * | 11/2006 | McGee | G06F 17/30814 348/E5.108 |
| 7,289,812 B1 | 10/2007 | Roberts et al. | |
| 7,320,137 B1 * | 1/2008 | Novak | G11B 27/34 348/E7.071 |
| 7,406,656 B2 | 7/2008 | Schroeder | |
| 7,890,599 B2 * | 2/2011 | Kalmanje | H04N 7/17309 455/411 |
| 8,010,620 B2 | 8/2011 | Ahn | |
| 8,020,000 B2 * | 9/2011 | Oostveen | H04N 19/467 713/176 |
| 8,082,504 B1 | 12/2011 | Tischer | |
| 8,256,333 B2 | 9/2012 | Begin et al. | |
| 8,265,333 B2 | 9/2012 | Lahr et al. | |
| 8,271,334 B1 | 9/2012 | Funk et al. | |
| 8,312,376 B2 | 11/2012 | Barrett | |
| 8,539,331 B2 * | 9/2013 | Pettit | G06F 17/30884 715/206 |
| 8,583,489 B2 | 11/2013 | Funk et al. | |
| 8,584,165 B1 | 11/2013 | Kane et al. | |
| 8,819,166 B2 | 8/2014 | Ahn et al. | |
| 2003/0052918 A1 | 3/2003 | Drane et al. | |
| 2004/0008970 A1 | 1/2004 | Junkersfeld et al. | |
| 2009/0063277 A1 | 3/2009 | Bernosky et al. | |
| 2009/0074235 A1 * | 3/2009 | Lahr | G06F 17/30799 382/100 |
| 2010/0153848 A1 | 6/2010 | Saha | |
| 2011/0135283 A1 | 6/2011 | Poniatowki et al. | |
| 2011/0231436 A1 * | 9/2011 | Seidel | G06F 17/30038 707/769 |
| 2011/0283175 A1 | 11/2011 | Pettit et al. | |
| 2011/0320429 A1 * | 12/2011 | Doig | G06F 17/30893 707/711 |
| 2012/0027380 A1 * | 2/2012 | Marsh | G06F 17/3002 386/241 |
| 2012/0089911 A1 | 4/2012 | Hosking et al. | |
| 2012/0117584 A1 * | 5/2012 | Gordon | H04N 21/254 725/19 |

OTHER PUBLICATIONS

Google Inc., International Search Report and Written Opinion, PCT/US2013/068145, Feb. 3, 2014, 11 pgs.
Sony, Youtube Content Now Available on Sony Bravia Internet Video Link, Internet Citation, Jun. 5, 2008, 1 pg.
Topolsky, Apple TV Review, Home Entertainment, HD Set Tops, Sep. 29, 2010, pp. 1-13.

* cited by examiner

Example bookmark database 134

| Bookmark | Status | Associated URL(s) | URL Metadata |
|---|---|---|---|
| Google.com/ OlympicVideo | Provisional | Youtube.com, "2012 Olympic Ceremony" ← 411 | |
| | | WSJ.com, "London Olympic clips" ← 412 | |
| Google.com/CATripVideo | Non-Provisional | Youtube.com/CATravel ← 413 | Free access |
| | | Youtube.com/CalTRIP ← 414 | Free access |
| | | WSJ.com/CATRip ← 415 | Fee required |
| Google.com/ PatentBarAudio | Invalid | | |
| Patentable Subject Matter | Provisional | CBS.com, "XYZ" ← 416 | Official site |
| | | YouTube.com, "Law Order XYZ" ← 417 | Authorized |
| | | CBSCopycat.com, "Law and Oder" ← 418 | Non-official |
| | | MovieTrailerOnly.com/lawordertrailers ← 419 | Trailer only |

402 → Google.com/OlympicVideo
404 → (Provisional row)
406 → Google.com/CATripVideo
408 → Google.com/PatentBarAudio
410 → Patentable Subject Matter

Figure 4

BOOKMARKING PROSPECTIVE MEDIA CONTENT ON COMPUTER NETWORK

RELATED APPLICATIONS

This application is a continuation of U.S. patent application Ser. No. 13/668,104, filed Nov. 2, 2012, entitled "Bookmarking Prospective Media Content on Computer Network," which is hereby incorporated by reference in its entirety.

TECHNICAL FIELD

The disclosed implementations relate generally to bookmarking prospective media content on computer network.

BACKGROUND

Providing bookmarks for media content that is not currently available but will likely be available in the near future has become increasingly important. For example, while watching a Law and Order episode on TV, a viewer might search for the same episode, on the Internet, because he or she would like to repeat the episode at a later time.

Difficulties abound, however, because if a TV episode is not currently available on the Internet (as is commonly the case for newly-aired TV episodes), when that episode would be made available online is often not known at the time the viewer is searching for it, and frustration arises when repeated searches turn up no useful results. In addition, being unable to provide useful search results, a content provider (e.g., YouTube.com) might lose an opportunity to deliver content desired by a viewer when it becomes available.

The above identified difficulties are reduced or eliminated by the systems and methods disclosed herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 4 is a block diagram chart illustrating an example bookmark database, in accordance with some implementations.

DETAILED DESCRIPTION

Figure 1:
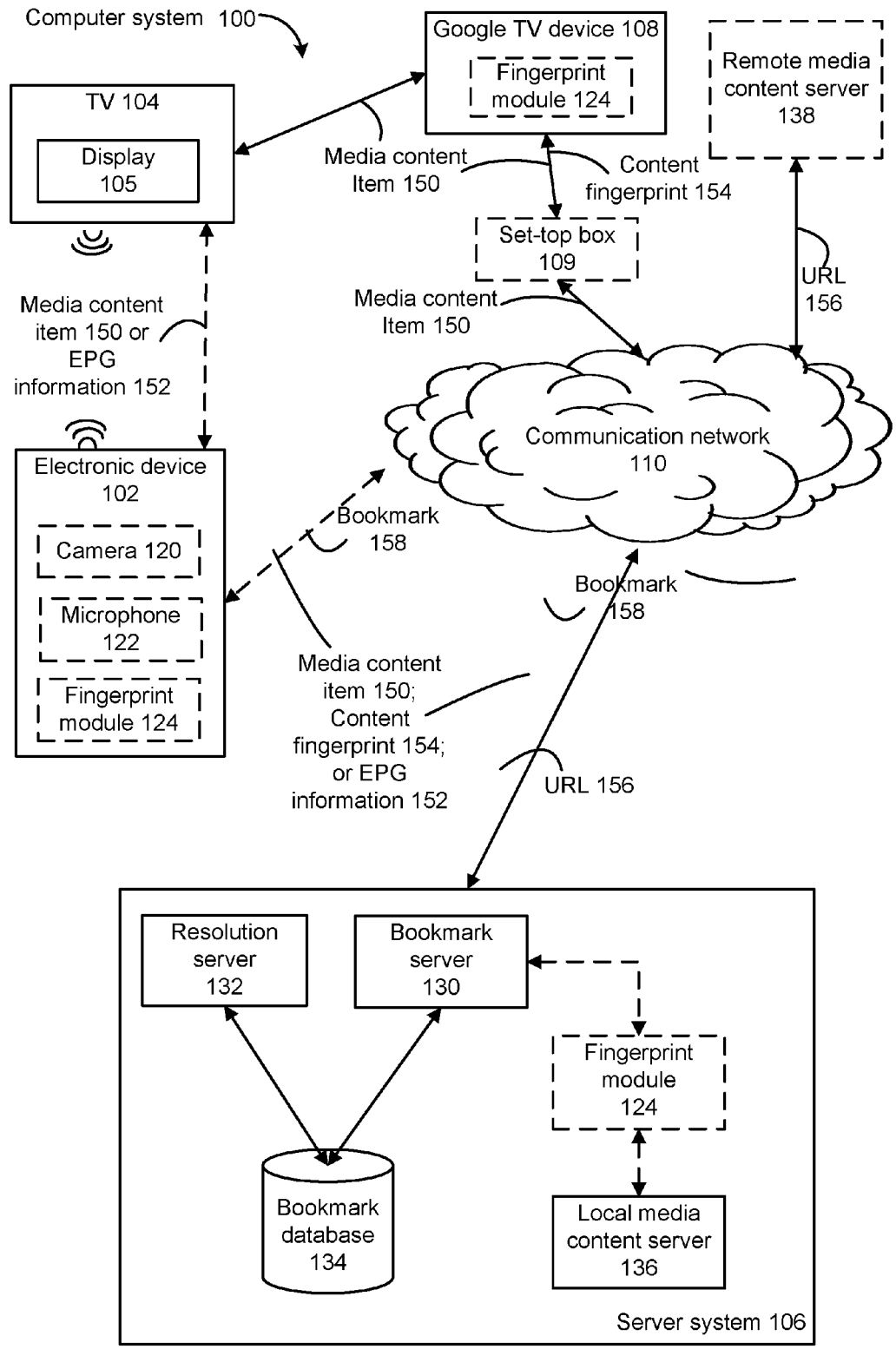
FIG. 1 is a block diagram illustrating a computer system, in accordance with some implementations.

The implementations described herein provide techniques for bookmarking prospective media content on computer networks. These techniques enable a user to "pre-bookmark" media content by creating a reference to media content before the content actually becomes available on the Internet or other computer networks. For example, consider a situation where a viewer is watching a newly broadcast show episode on TV that he or she would like to watch again when it becomes available for viewing via Internet streaming (typically after a short lock-up period of some time). Some implementations allow a user to bookmark the episode (e.g., by selecting a "bookmark" button on a remote control or a smart phone user interface) for later watching, even before the content is available for streaming. This is accomplished in some implementations by first identifying what show or episode the user is watching, determining one or more network/Internet locations where that episode is likely to become available, and then creating a prospective bookmark that refers to that location.

In some situations the future location of a show episode or other media content item can be predicted (e.g., when URLs for a particular TV show episode adheres to common formats). When this is the case, in some implementations a stored bookmark is created using the predicted URL (though such bookmark may not be actionable until the show actually is available at that URL). In some situations, the future location of the media content item is difficult if not impossible to predict (e.g., when the URL for a particular episode is likely to include a non-deterministic alphanumeric value). When this is the case, in some implementations a stored bookmark is created that references the URL of a place holder web page that is associated with the locations of one or more web domains, or perhaps show pages, for the pre-bookmarked TV show episode or other media content item. These prospective bookmarks are then resolved to a determined network URL at a future time when the corresponding media item becomes available for streaming (or downloading), at which time the prospective bookmarks also become actionable by viewers. The prospective bookmarks (whether predicted or not) are transmitted to the user via an electronic device so the corresponding pre-bookmarked locations can be later accessed by the user from an Internet browser or a media player application, to name a few options. In some implementations, a server keeps track of the pre-bookmarked locations saved for particular user and attempts to periodically to resolve them to an actual web page where the respective media content is available.

In this way, as media content is displayed on a TV, a reference to a network location where the media content is likely to be made available can be provided to a user (even before the media content actually become available online). This approach is beneficial in that: the user need not know when media content the user desires will become available online; nor will the user need to conduct a subsequent search for the media content.

Additional details of implementations are now described in relation to the Figures.

FIG. 1 is a block diagram illustrating a computer system 100 for bookmarking prospective media content on a computer network. In some implementations, the computer system 100 includes one or more electronic devices 102 (e.g., a phone, a tablet, or a laptop), a TV 104, a server system 106 ("server 106"), an intermediate Google TV-enable device 108 (e.g., a Google TV device), optionally a set-top box 109, and a communication network 110.

In some implementations, the Google TV device 108 receives media content items 150 (e.g., TV episodes, movies, songs, or music videos are received via a set-top box 109) from one or more content providers, such as a broadcasting network, a cable or satellite network or an Internet content provider, and transmits the received media content items 150 to the TV 104 for display. In some implementations, the set-top box 109 connects to the Google TV device 108 (e.g., via a HDMI cable) to the communication network 110. In some implementations, a media content item 150 includes meta-data identifying the media content item 150, such as Electronic Program Guide (EPG) information 152 (e.g., a channel number associated with a TV episode). In other implementations, a media content item 150 does not include meta-data (e.g., title of a TV episode) identifying the media content item, and thus the TV 104 or the Google TV device 108 does not know what media content item it is displaying. In some implementations, the Google TV device 108 includes a fingerprint module 124 that generates one or more fingerprints (e.g., content fingerprints 154), which are used to identify a media content item (e.g., to identify which Law and Order episode is being display on a user's TV). In some implementations, the Google TV device 108 or the electronic device 102 receives media content item 150, or a portion thereof, or electronic programming guide (EPG) information 152 (e.g., title or channel number associated with a TV episode being displayed on TV) from the TV 104. In some implementations, the Google TV device 108 or the electronic device 102 generates (e.g., using the fingerprint module 124) one or more content fingerprints 154 of the received media content item, or the portion thereof.

In some implementations, the TV 104 displays a media content item 150 (e.g., a TV episode, a movie or a music TV) received from the Google TV device 108 or from the set-top box 109. In some implementations, the TV 104 includes a display 105 (e.g., a TV screen).

In some implementations, the electronic device 102 receives a media content item 150 (or a portion thereof) or Electronic Program Guide (EPG) information 152 concerning the media content item 150, from the TV 104. In some implementations, the electronic device 102 then sends information corresponding to the media content item 150 to the server 106. In some implementations, the information is a portion (video or audio) of the media content item being displayed on the TV 104 (e.g., 10 seconds, audio or video, of a Law and Order episode being displayed on TV). In some implementations, the information corresponding to media content item being displayed on the TV 104 is the Electronic Program Guide (EPG) information (e.g., a channel number associated with the TV episode displayed on TV). In other implementations, the information corresponding to the media content item being displayed on the TV 104 is a content fingerprint 154 (e.g., a hash value of the 50 seconds of the Law and Order episode).

In some implementations, the electronic device 102 then receives a bookmark 158 (e.g., a link or reference to a web page, that when activated redirects a user to the web page) for accessing the media content item, from the server 106. In some implementations, the bookmark 150 is a provisional bookmark, and the electronic device 102 can access the media content item on a computer network (e.g., the Internet) after the provisional bookmark is converted into a non-provisional bookmark. In some implementations, the bookmark 150 is a non-provisional bookmark, and the electronic device 102 can access the media content item on a computer network (e.g., the Internet) as soon as receiving the bookmark.

In some implementations, the electronic device 102 includes a camera 120, a microphone 122, and optionally a fingerprint module 124. In some implementations, the camera 120 captures a moving or still image (e.g., a video portion) of the media content item being displayed on TV. In some implementations, the microphone 122 captures audio portion of the media content item being displayed on the TV 104. In some implementations, the fingerprint module 124 generates one or more fingerprints of the media content item, in accordance with the video or audio portion captured by the camera 120 or the microphone 122, respectively. In some implementations, the electronic device 102 is or includes the Google TV device 108.

In some implementations, the server 106 identifies a media content item (e.g., a TV episode) being displayed on TV, and generates a bookmark (e.g., a redirecting web page) corresponding to a URL (e.g., URL 156) where the media content item (e.g., the TV episode) is not yet available but is likely to be available, within a predefined time period (e.g., within 24 hours of the episode's initial air on TV). In some implementations, where the media content item (e.g., the TV episode) is not yet available but is likely to be available in the near future, the server 106 generates or identifies the URL (e.g., URL 156) after generating the bookmark. In some implementations, where a media content item is not presently available, between the bookmark is generated and the server 106 subsequently identifies one or more URLs where the media content item is available, the bookmark functions as a placeholder and is non-actionable (e.g., not clickable) by a user. In some implementations, where a media content item is presently available, the bookmark functions as a redirecting web page and is actionable (e.g., clickable) by a user, as soon as the bookmark is created.

In some implementations, the server 106 includes a bookmark server 130, a resolution server 132, a bookmark database 134, a local media content server 136, and optionally a fingerprint module 124. In some implementations, the fingerprint module 124 generates one or more content fingerprints 154 of a media content item (e.g., a TV episode being displayed on a user's TV), and transmits the fingerprints 154 to the bookmark server 130.

In some implementations, the bookmark server 130 identifies a media content item (e.g., using the fingerprints, a channel number or title associated with the TV episode). In some implementations (e.g., when the media content item is not currently available online), the bookmark server 130 generates a provisional bookmark (e.g., the bookmark 158) corresponding to a domain-description pair, which includes a domain name (e.g., YouTube.com) and a description of the media content item (e.g., search keywords). In some implementations, a description of a media content item in a domain-description pair includes information identifying the media content item (e.g., title of a TV episode).

In some implementations, the resolution server 132, on a predefined schedule, identifies one or more URLs (where a media content is available) corresponding to a provisional bookmark. In some implementations, the one or more URLs refer to network locations, where a media content item has become available after its corresponding bookmark was generated. In some implementations, the resolution server 132 identifies URLs corresponding to a bookmark, in accordance with domain-description pairs associated with the bookmark—for example, by executing a search on the domain (e.g., YouTube.com) using the description (e.g., search keywords).

In some implementations, the resolution server 132 determines (or verifies), after a predefined time period (e.g., 24 hours after the TV episode's initial air on TV), whether a media content item has become available on a computer network (e.g., the Internet), and updates bookmark status accordingly (e.g., marking a provisional bookmark as invalid if the corresponding media content item has not become available online, or converting a provisional bookmark into a non-provisional bookmark if the corresponding media content item has become available).

In some implementations, the bookmark database 134 stores (i) mappings between a provisional bookmark and one or more domain-description pairs (411 and 412 in FIG. 4), or (ii) mappings between a non-provisional bookmark and one or more URLs (e.g., URLs where a media content item is presently available; 413-415 in FIG. 4). In some implementations, the one or more URLs include a URL referring to media content item stored at the local media content server 136 (e.g., a preferred content provider). In some implementations, the one or more URLs include a URL referring to media content item stored at a remote media content server 138 (e.g., a secondary or less preferred content provider). In some implementations, when a non-provisional bookmark corresponds to two or more URLs, the server 106 determines which URL of the two or more URLs a user is redirected to. In other implementations, the server 106 prompts a user to determine whether URL of the two or more URLs the user is redirected to.

In some implementations, the communication network 110 optionally includes the Internet, one or more local area networks (LANs), one or more wide area networks (WANs), other types of networks, or a combination of such networks.

Figure 2:
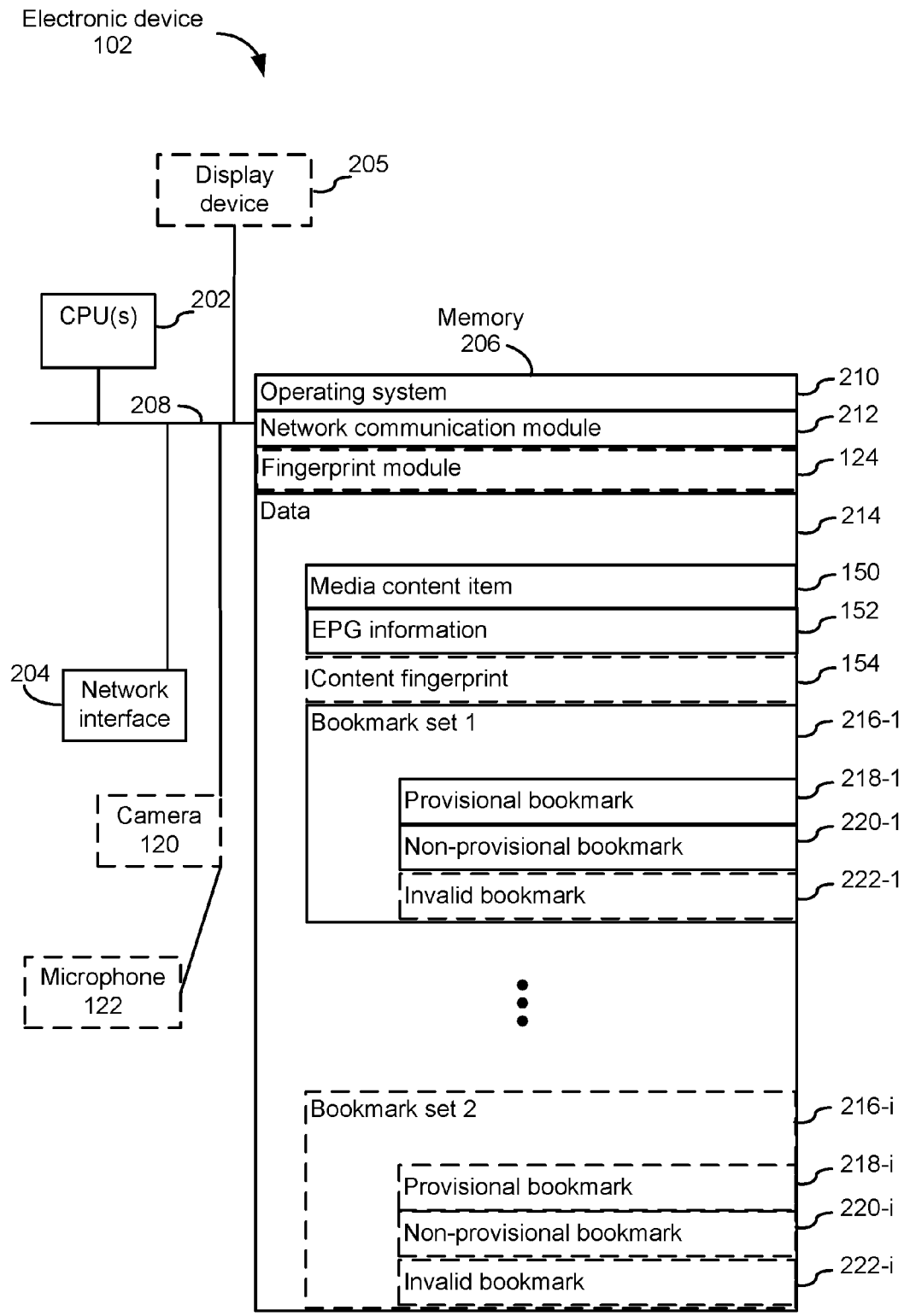
FIG. 2 is a block diagram illustrating an electronic device, in accordance with some implementations.

FIG. 2 is a block diagram illustrating an electronic device 102 ("electronic device 102") in accordance with some implementations. The electronic device 102, in some implementations, includes one or more processing units CPU(s) 202 (also herein referred to as processors, one or more network interfaces 204, optionally a display device 205, memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternately the non-volatile memory device(s) within the memory 206, comprises a non-transitory computer readable storage medium. In some implementations, the memory 206 or alternately the non-transitory computer readable storage medium stores the following programs, modules and data structures, or a subset thereof:

an operating system 210, which includes procedures for handling various basic system services and for performing hardware dependent tasks;
a network communication module (or instructions) 212 for connecting the electronic device 102 with other devices (e.g., a TV 104 or a server 106) via one or more network interfaces 204 (wired or wireless) or the communication network 110 (FIG. 1);
optionally (e.g., when the electronic device 102 has an appropriate level of computing power) a fingerprint module 124 for generating a content fingerprint (e.g., a hash value) that uniquely identifies a media content item (e.g., identifies a TV episode being aired on TV as a particular Law and Order episode); and data stored on the electronic device 102, which include:
a media content item 150 for including media content (e.g., a song, a music TV, a movie, a TV episode or a YouTube clip) or a portion thereof;
EPG (e.g., Electronic Program Guide) information 152 for including electronic program guide information (e.g., channel number, title of a TV episode, or name of a cable network) for uniquely identifying a media content item;
a content fingerprint 154 (e.g., a hash value generating using the first 10 second of a TV episode) for uniquely identifying a media content item; and
one or more bookmark sets 216 (e.g., bookmark sets 216-1 through 216-i) for including bookmarks corresponding to one or more particular users, each bookmark set including:
a provisional bookmark 218-i, which corresponds to one or more domain-description pairs (e.g., when a media content item is not yet available but is likely to be available);
a non-provisional bookmark 220-i, which corresponds to one or more URLs where a media content item is presently available; and
optionally, an invalid bookmark 222-i, when corresponding media content item did not become available (or was not identified by the server 106 as available) within a predefined time period;

In some implementations, the electronic device 102 also includes the camera 120 and the microphone 122. In some implementations, the camera 120 captures, with or without user intervention, audio or video portion, of a media content item, and the microphone 122 captures, with or without user intervention, audio portion of a media content item.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
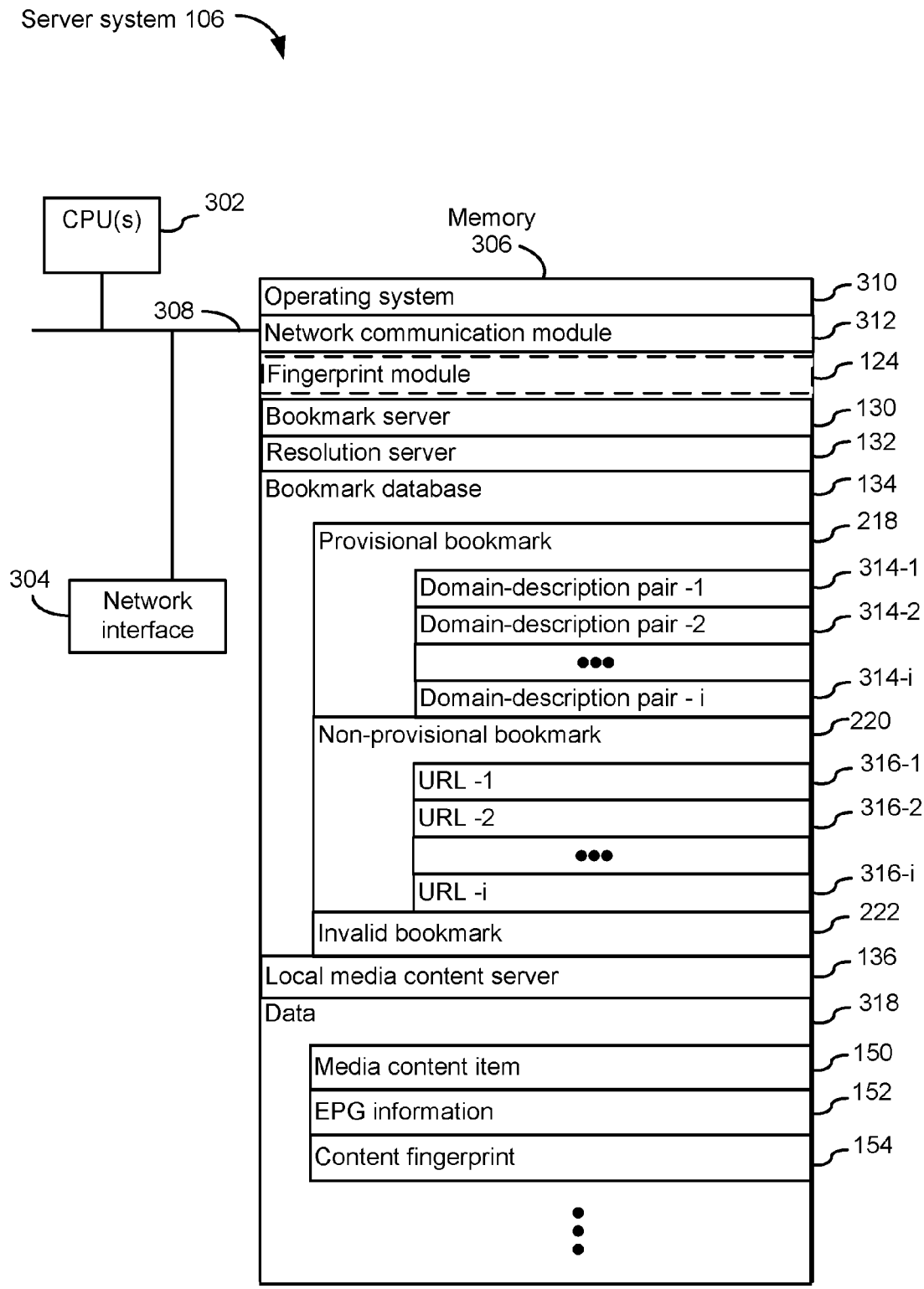
FIG. 3 is a block diagram illustrating a server system, in accordance with some implementations.

FIG. 3 is a block diagram illustrating the server system 106 ("server 106"; also called a server), in accordance with some implementations. The server 106 typically includes one or more processing units CPU(s) 302 (also herein referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternately the non-volatile memory device(s) within the memory 306, comprises a non-transitory computer readable storage medium. In some implementations, the memory 306 or alternately the non-transitory computer readable storage medium stores the following programs, modules and data structures, or a subset thereof:

an operating system 310, which includes procedures for handling various basic system services and for performing hardware dependent tasks;

a network communication module (or instructions) 312 for connecting the server 106 with other devices (e.g., an electronic device 102) via the one or more network interfaces 304 (wired or wireless), or the communication network 110 (FIG. 1);

optionally, a fingerprint module 124 for generating a content fingerprint (e.g., a hash value) that uniquely identifies a media content item;

a bookmark server 130 for identifying a media content item (e.g., identifying a TV episode displaying on TV), and for generating one or more provisional or non-provisional bookmarks;

a resolution server 132 for identifying whether and where (e.g., at what particular URLs) a media content item corresponding to a provisional bookmark has become available, and for updating the bookmark's status accordingly (e.g., marking a bookmark as invalid, or converting a provisional bookmark into a non-provisional bookmark);

a bookmark database 134 for storing (i) mappings between a provisional bookmark and one or more domain-description pairs, or (ii) mappings between a non-provisional bookmark and one or more URLs, including:

a provisional bookmark 218 (e.g., the bookmark 404 in FIG. 4) that corresponds to one or more domain-description pairs 314 (e.g., domain-description pair 314-1 through domain-description pair 314-i), which in turn can be used to identify where (e.g., at which URLs) a media content item is not yet available but is likely to become available within a predefined time period (e.g., within the next 24 hours);

a non-provisional bookmark 220 (e.g., the bookmark 406 in FIG. 4) that corresponds to one or more URLs (e.g., URL 316-1 through URL 316-i) where a media content item is presently available—as opposed to not yet available but is likely to become available within a predefined time period—and to metadata associated with the corresponding URL (see FIG. 4, "URL Metadata"); and optionally an invalid bookmark 222 (e.g., the bookmark 408 in FIG. 4) whose corresponding media content item has not become available after a predefined time period;

a local media content server 136 for including media content items stored on network locations having a predefined relationship with the server 106 (e.g., within a predefined distance (or stored locally), or belonged to a same service provider); and data stored on the server 106, which include:

a media content item 150 for including media content (e.g., a song, a music TV, a movie, a TV episode or a YouTube clip) or a portion thereof;

Electronic Program Guide (EPG) information 152 for including electronic program guide information (e.g., channel number, title of a TV episode, or name of a cable network) for uniquely identifying a media content item; and a content fingerprint 154 for uniquely identifying a media content item (e.g., a hash value generating using the 10 second of a TV episode).

In some implementations, one or more of the above identified elements are stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 optionally stores additional modules and data structures not described above.

Although FIG. 3 shows a "server system 106," also referred to as a server, FIG. 3 is intended more as functional description of the various features which may be present in server system than as a structural schematic of the implementations described herein. In practice, and as recognized by those of ordinary skill in the art, items shown separately could be combined and some items could be separated.

FIG. 4 is a block diagram chart illustrating an example bookmark database 134, in accordance with some implementations.

As shown in FIG. 4, in some implementations, the bookmark database 134 stores one or more bookmarks, status of these bookmarks, one or more domain-description pairs or URLs associated with a bookmark, and URL metadata.

In some implementations, a bookmark is a reference or a link (e.g., a shortcut) to a web page that when activated redirects a user to the web page. In some implementations, a bookmark is a reference to a web page (e.g., a web page available at Google.com/OlympicVideo) owned or under control by the owner of the server 106 (e.g., Google).

In some implementations, the status of a bookmark is one of: provisional, non-provisional, or invalid. In some implementations, a provisional bookmark corresponds to one or more domain-description pairs. For example, the provisional bookmark 404 corresponds to domain-description pairs 411 (Youtube.com, "2012 Olympic Ceremony") and 412 (WSJ.com, "London Olympic clips"). In some implementations, a non-provisional bookmark corresponds to one or more URLs. For example, the non-provisional bookmark 406 corresponds to URLs 413 ("Youtube.com/CATravel"), 414 ("Youtube.com/CalTRIP"), and 415 ("WSJ.com/CA-TRip"). In some implementations, a bookmark corresponds to at least a predefined number of (e.g., at least two) domain-description pairs or URLs, when redundancy is desired (e.g., because a media content item might be associated with different descriptions or removed from one URL without prior notice). In some implementations, a bookmark corresponds to at least one domain-value pair or at least one URL associated with a preferred website or web domain (e.g., YouTube.com or Google.com/video), to ensure content authenticity.

In some implementations, a URL is associated with metadata concerning: quality of a media content item available at the URL (e.g., high definition "HD" or low quality, a full length version or a trailer or preview version), access requirement for a media content item (e.g., fee or subscription required or free access), or characteristics of the URL (e.g., whether the URL belongs to an official or an authorized website). In some implementations, a domain-description pair is not associated with any metadata. In other implementations, a domain-description pair is associated with metadata (e.g., High resolution) concerning the domain (e.g., YouTube.com) (416-419 in FIG. 4).

In some implementations, URLs associated with a non-provisional bookmark are selected based on predefined criteria (e.g., media content item quality, cost or speed of access or URL ownership). In some implementations, when a non-provisional bookmark is associated with two or more URLs (e.g., the non-provisional bookmark 406 is associated with URLs 413-415), after activating the non-provisional bookmark, a user is directed to one or the two or more URLs in accordance with one or more predefined criteria (e.g., whether a URL belongs to an official content provider, such as YouTube, or to a content provider within a particular geographical region, such as a content provider located within the same country as a user).

Figure 5:
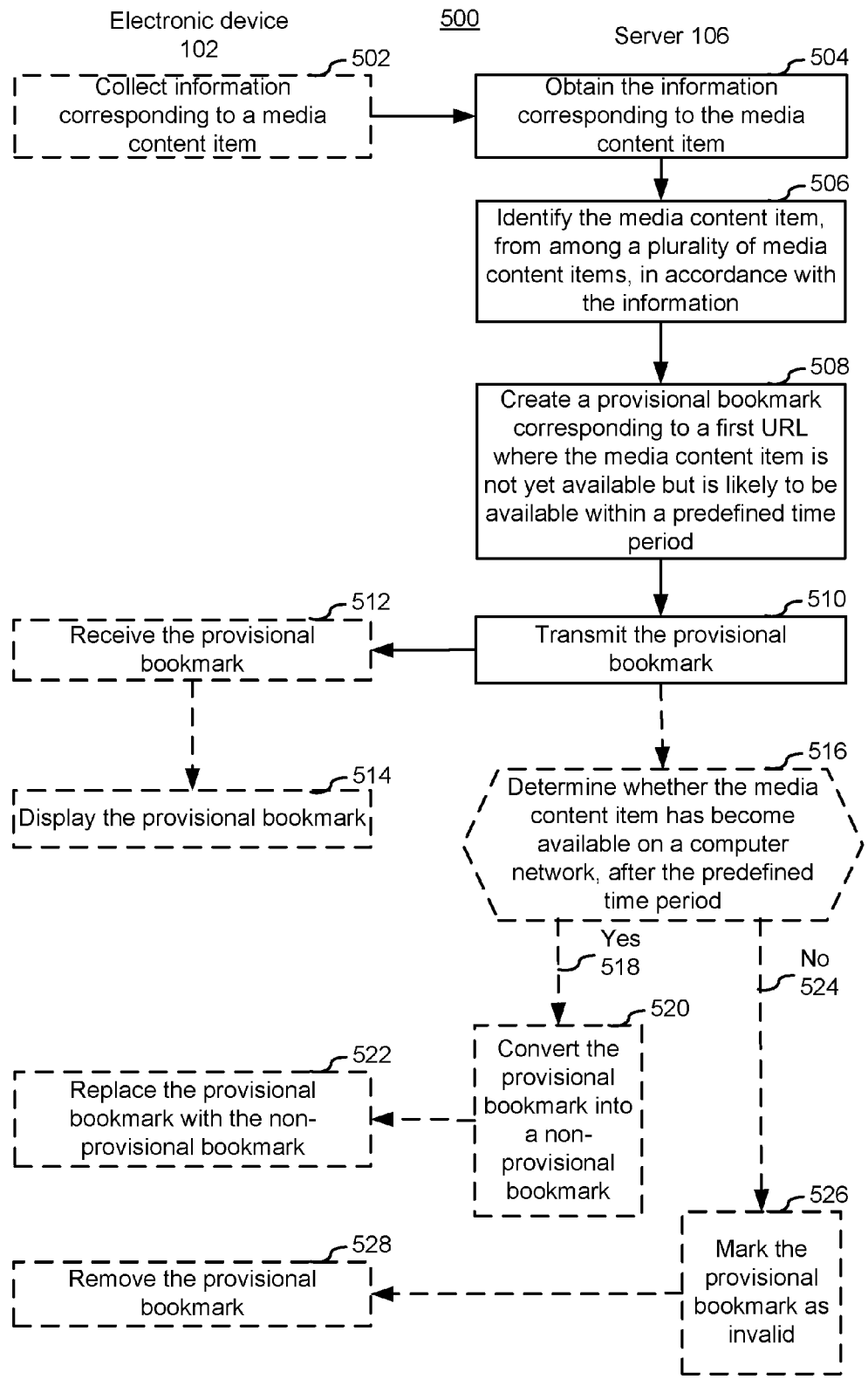
FIG. 5 is a flow chart illustrating a method for bookmarking prospective media content on computer network in a computer system, in accordance with some implementations.

FIG. 5 is a flow chart illustrating a method 500 for bookmarking prospective media content on computer network in a computer system, in accordance with some implementations.

In some implementations, an electronic device first collects (502) information corresponding to a media content item 150 (e.g., a Law and Order TV episode being aired on the TV 104) via the camera 110 or the microphone 122. In some implementations, the information is one of: (i) a portion of the media content item (e.g., 50 seconds of the Law and Order episode being air on TV), (ii) a content fingerprint of the media content item (e.g., a hash value generated using the 50 seconds of the Law and Order episode), or (iii) electronic program guide (EPG) information (e.g., channel number, or title) identifying the media content item. In some implementations, where the information is a fingerprint of the media content item, the fingerprint is generated by the electronic device (e.g., when the electronic device has an appropriate level of computing power) or by the server.

In some implementations, the server then obtains (504) the information corresponding to the media content item from the electronic device (e.g., via the communication network 110).

In some implementations, after obtaining (504) the information corresponding to the media content item, the server identifies (506) the media content item, from among a plurality of media content items, in accordance with the information. In some implementations, the server identifies (506) the media content item, from among a plurality of media content items, using meta-data associated with the media content item. For example, using the channel number or metadata associated with the Law and Order episode being aired on TV, the server identifies the episode as the second episode from the fifth season of the Law and Order series, entitled "XYZ."

In some implementations, after identifying (506) the media content item, the server creates (508) a provisional bookmark (e.g., bookmark 404 in FIG. 4) corresponding to a first URL (e.g., URL 411) where the media content item is not yet available but is likely to be available within a predefined time period. In some implementations, the first URL is generated or identified after the provisional bookmark is created. For example, after identifying a video being aired on a TV as the part of the 2012 Olympic Games opening ceremony, the server creates a domain-description pair ("Youtube.com," "2012 Olympic Ceremony") that identifies a domain and a description for that particular media content item. Subsequently, the resolution server 132 will identify a first URL where a "2012 Olympic Opening Ceremony" episode is available.

In some implementations, when a media content item is not presently available, the server knows or predicts, with or without user intervention, where the media content item is likely to be available at one or more URLs (or domains in general), in accordance with customary practices or common knowledge among the media and entertainment industry. For example, a cable provider may normally make a TV episode available on TV first, then within 24 hours of its initial appearance on TV, make the TV episode available its official website, and within another 8 days, websites of its affiliates' websites and third party video services.

In some implementations, the server then transmits (510) the provisional bookmark to the electronic device. In some implementations, the electronic device receives (512) the provisional bookmark and displays (514) the provisional bookmark (e.g., in a web browser) to a user. In some implementations, a provisional bookmark is non-clickable, greyed-out, or non-actionable, as so to represent that a media content item is not yet available.

In some implementations, after transmitting (510) the provisional bookmark to the electronic device, the server further determines (516) whether the media content item has in fact become available online, after the predefined time period. For example, after creating the bookmark 404, and 24 hours after the opening ceremony of the 2012 Olympic Games was aired live on TV, the server determines whether it has become available online, by searching (1) "2012 Olympic Ceremony" on the domain Youtube.com or (2) "London Olympic clips" on domain WSJ.com (411 or 412 in FIG. 4).

In some implementations, in accordance with a determination that the media content item has become available ("Yes" 518) at one or more URLs before the predefined time period expires, the server converts (520) the provisional bookmark into a non-provisional bookmark. In some implementations, the server also converts (520) the provisional bookmark into a non-provisional bookmark, if the media content item has become available at a (new) URL not previously identified as corresponding to the provisional bookmark.

In some implementations, after converting (520) the provisional bookmark into a non-provisional bookmark, the server updates the bookmark by replacing the one or more domain-description pairs with the one or more URLs where the media content item has become available. For example, after searching (1) "2012 Olympic Ceremony" on the domain Youtube.com or (2) "London Olympic clips" on domain WSJ.com, the domain-description pairs 411 and 412 are substituted with URLs on these domains where the 2012 Olympic Games opening ceremony is available, such as "YouTube.com/OlymGamesOpen," or "WJS.com/2012London".

In some implementations, after a provisional bookmark is converted into a provisional bookmark, the electronic device replaces the provisional bookmark displayed on the electronic device (e.g., a greyed-out bookmark) with the provisional bookmark (e.g., a clickable bookmark).

In some implementations, in accordance with a determination that the media content item has not yet become available online ("No" 524) after the predefined time period, the server marks (526) the provisional bookmark as invalid. In some implementations, when a provisional bookmark is marked as invalid, the server removes (528) the provisional bookmark from the electronic device, or promotes a user to delete the provisional bookmark.

Figure 6A:
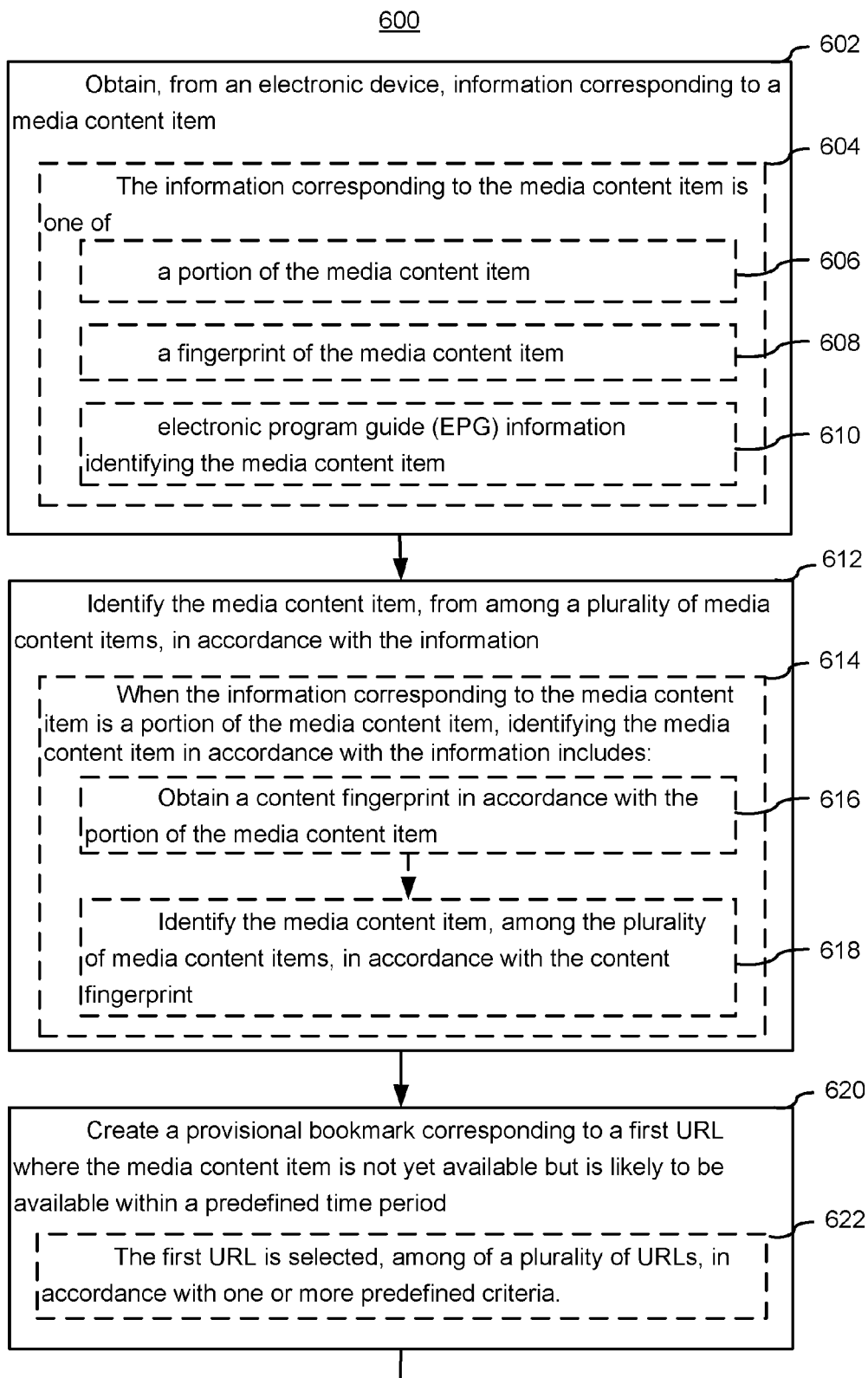
FIGS. 6A-6B are flow charts illustrating a method for bookmarking prospective media content on computer networks at a server system, in accordance with some implementations.
Figure 6B:
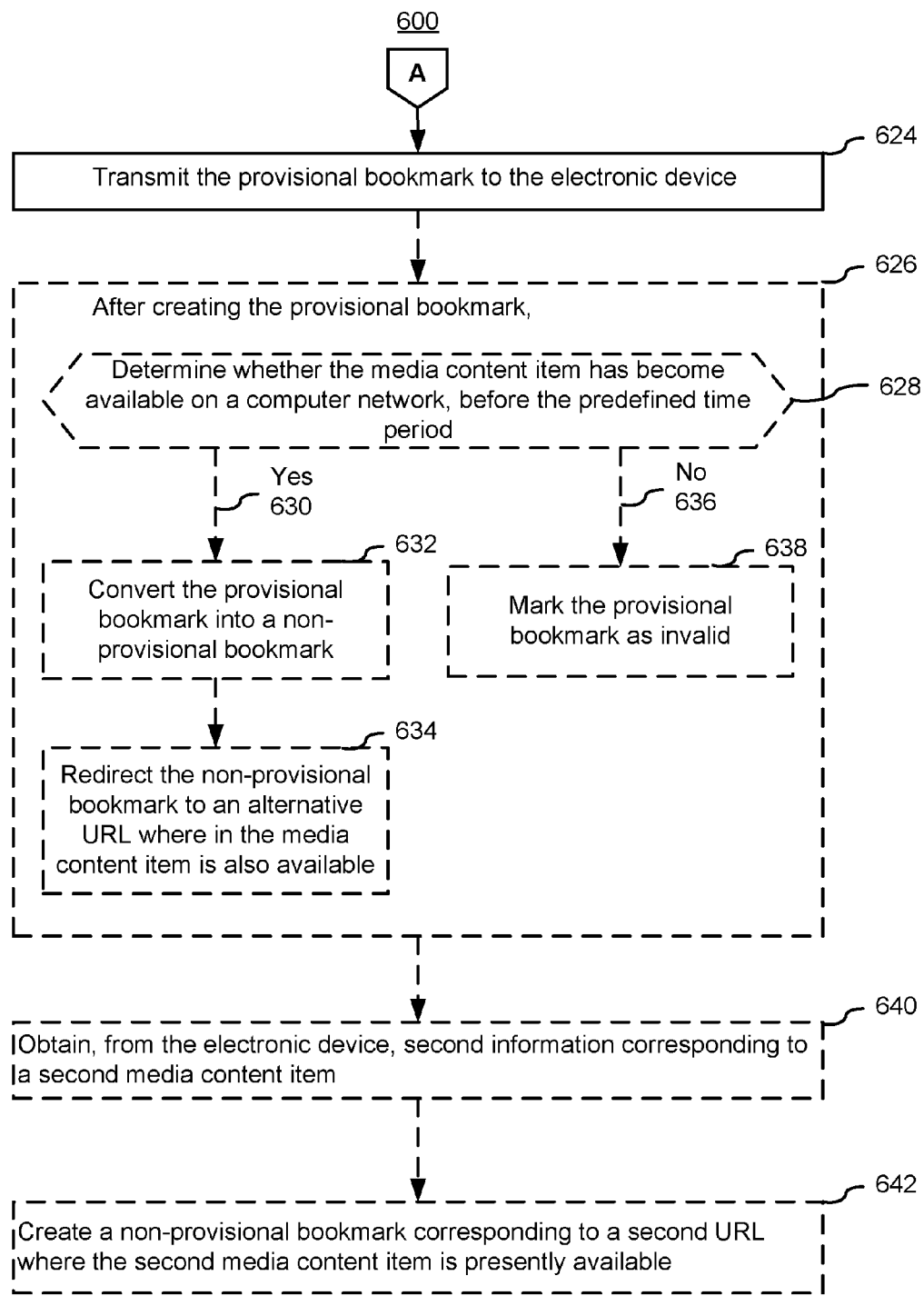

FIGS. 6A-6B are flow charts illustrating a method 600 for bookmarking prospective media content on computer network at a server system, in accordance with some implementations.

In some implementations, the server first obtain (602), from an electronic device (e.g., a smart phone or a tablet), information corresponding to a media content item (e.g., a Law and Order episode being aired on TV). In some implementations, the media content item (e.g., the Law and Order episode) has not yet become available but is likely to be made available on a computer network (e.g., made available on the Internet) within a predefined time period.

In some implementations, the information (604) corresponding to the media content item is one of: (i) a portion of the media content item (606) (e.g., 50 seconds of the Law and Order episode being air on TV, video or audio), (ii) a content fingerprint of the media content item (608) (e.g., a hash value generated using the 50 seconds of the Law and Order episode), or (iii) electronic program guide (EPG) information (610) (e.g., channel number, or title) identifying the media content item.

In some implementations, the information corresponding to the media content item is obtained from media content promoting the media content item. For example, the portion of the media content item (606) (e.g., 50 seconds of a Law and Order episode) or the fingerprint (608) is obtained from a TV commercial promoting that episode, rather than from the episode itself.

In some implementations, after obtaining the information (604) corresponding to the media content item, the server identifies (612) the media content item, from among a plurality of media content items, in accordance with the information. For example, using the fingerprint or the channel number associated with the Law and Order episode being aired on TV, the server identifies the episode as the second episode from the fifth season of the Law and Order series, entitled "XYZ." In some implementations, when the information corresponding to the media content item is a portion of the media content item, identifying (604) the media content item in accordance with the information includes: obtaining (616) a content fingerprint (e.g., using the fingerprint module 124) in accordance with the portion of the media content item; and identifying (618) the media content item, among a plurality of media content items, in accordance with the content fingerprint.

In some implementations, after identifying the media content item, the server creates (620) a provisional bookmark (e.g., bookmark 410 in FIG. 4) corresponding to a first URL (e.g., URL 411) where the media content item is not yet available but is likely to be available within a predefined time period. In some implementations, the first URL is generated or identified after the provisional bookmark is created. For example, after identifying a video being aired on a TV as the part of the 2012 Olympic Games opening ceremony, the server creates a domain-description pair ("Youtube.com," "2012 Olympic Ceremony"), in accordance with which, the resolution server 132 subsequently identifies a first URL among a plurality of URLs where a "2012 Olympic Opening Ceremony" episode has become available.

In some implementations, the first URL is selected (622), among of a plurality of URLs, in accordance with one or more predefined criteria. In some implementations, the one or more predefined criteria include one of: quality (e.g., high definition "HD" or low quality) associated with a media content item to be available at the first URL, cost (e.g., fee or subscription required, such as content at WSJ.com, or free access, such as content on YouTube.com) or speed (high or low connection speed) associated with accessing the media content item at the first URL, or whether the first URL belongs to an official or authorized provider of the media content item (e.g., selecting cnn.com/video rather than Cnn-CopyCat.com/video for a CNN news video).

In some implementations, where redundancy is desired, two or more domain-description pairs are selected and associated with a provisional bookmark (e.g., because media content items online might be associated with or tagged with different descriptions). For example, in FIG. 4, domain-description pairs 411 and 412 are selected and associated with the provisional bookmark 404.

In some implementations, after creating (620) the provisional bookmark, the server 106 transmits (624) the provisional bookmark to the electronic device. In some implementations, the provisional bookmark is displayed as a bookmark in a web browser (e.g., a bookmark in Google Chrome). In some implementations, a provisional bookmark is displayed in a visually distinctive manner from a non-provisional bookmark. For example, a provisional bookmark is displayed as greyed-out, non-clickable, or non-actionable, but a non-provisional bookmark is displayed as clickable or actionable.

In some implementations, after creating (620) the provisional bookmark, the server further determines (628) whether the media content item has become available online. For example, after creating the bookmark 404, and 24 hours after the opening ceremony of the 2012 Olympic Games was aired live on TV, the server determines whether it has become available online, by searching (1) "2012 Olympic Ceremony" on the domain Youtube.com or (2) "London Olympic clips" on domain WSJ.com (411 and 412 in FIG. 4).

In some implementations, in accordance with a determination that the media content item has in fact become available ("Yes" 630), before the predefined time period expires, the server converts (632) the provisional bookmark into a non-provisional bookmark. For example, when the server determines, 24 hours after a TV episode's initial air on TV, the episode has become available at at least one or the URLs associated with the provisional bookmark, or a new URL not previously associated with the provisional bookmark, the server transforms the appearance of the provisional bookmark on the electronic device into that of a non-provisional bookmark (e.g., change the bookmark from greyed-out or non-clickable to clickable).

In some implementations, after a provisional bookmark is converted into a non-provisional bookmark, when a user clicks the non-provisional bookmark, the server redirects (634) the user to an alternate URL—that has not been previously associated with the non-provisional bookmark—where the media content item is also available. For example, after the provisional bookmark 404 is converted into a non-provisional bookmark (which corresponds to URLs 413-315), the server (e.g., the resolution server 133) discovers an alternate URL—that has not been previously associated with the bookmark 406 (e.g., a URL other than the URLs 413-315)—where the TV episode is also available. In some implementations, the server 106 updates the bookmark database, for example to add the alternate URL as a URL associated with the bookmark 406. In some implementations, after clicking the bookmark 406, a user is directed (or redirected) to the alternate URL, rather than a URL previously associated with the bookmark 406 (e.g., URLs 413-415). This approach is beneficial because it allows newly discovered locations where content desired by a user is available to be made known to the user, thereby enhancing efficiency and flexibility.

In some implementations, in accordance with a determination that the media content item did not become available online ("No" 636) after the predefined time period—e.g., 24 hours after the opening ceremony, searching "2012 Olympic Ceremony" on "Youtube.com," or "London Olympic clips" on "WSJ.com" does not return any URL where the opening ceremony of the 2012 Olympic Game is available—the server marks (638) the provisional bookmark as invalid (e.g., the server removes the provisional bookmark from the electronic device, or promotes a user to delete the provisional bookmark).

In some implementations, a server associates a bookmark with only URLs where a full version of a media content item is available. In some implementations, the server identifies an additional URL where a portion of the media content item is likely to be available within the predefined time period or is presently available; but forgoes creating a bookmark corresponding the additional URL, in accordance with a determination that the portion of the media content item is less than a threshold amount. For example, when the server identifies a URL where a trailer version (e.g., including only the first 10 minutes of a 60 minutes TV episode), rather than a full version, is likely to be available or is presently available, the server does not creates a bookmark for that URL or does not associate the bookmark with that URL.

In some implementations, where a second media content item is presently (or already) available on computer network, the server obtains (640), from the electronic device, second information corresponding to the second media content item; and creates (642) a non-provisional (rather than a provisional) bookmark corresponding to a second URL where the second media content item is presently available. For example, when a California Travel Video a user is watching on his or her TV is presently or already available on the Internet, the server creates a non-provisional bookmark (e.g., bookmark 406 in FIG. 4), which, when clicked, redirects a user to a URL (URL 413-415) where the California Travel Video is readily or presently available.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first URL could be termed a second URL, and, similarly, a second URL could be termed a first URL, which changing the meaning of the description, so long as all occurrences of the "first URL" are renamed consistently and all occurrences of the "second URL" are renamed consistently. The first URL, and the second URL are both URLs, but they are not the same URL.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
    at a computing system having one or more processors and memory storing one or more programs for execution by the one or more processors:
    obtaining from an electronic device,
    identifying information corresponding to a media content item being presented on a television associated with the electronic device,
    wherein the identifying information includes: (i) a portion of the media content item, or (ii) a fingerprint of the media content item;
    identifying the media content item in accordance with the obtained identifying information;
    based on identification of the media content item, obtaining one or more URLs of web pages where the media content item is not currently available but is predicted to be available within a predefined future time period; and
    creating a provisional bookmark corresponding to a first URL of the one or more URLs, wherein the first URL is selected from among the one or more URLs in accordance with one or more predefined criteria, including whether the first URL belongs to an official or authorized provider of the media content item; and transmitting the provisional bookmark to the electronic device.

2. The method of claim 1, further comprising:
obtaining from the electronic device second identifying information corresponding to a second media content item being presented on the television;
identifying the second media content item in accordance with the obtained second identifying information;
obtaining a second URL of a web page where the second media content item is currently available online; and
creating a non-provisional bookmark corresponding to the second URL.

3. The method of claim 1, wherein the identifying information corresponding to the media content item is electronic program guide (EPG) information identifying the media content item.

4. The method of claim 1, wherein, when the identifying information corresponding to the media content item is a portion of the media content item,
identifying the media content item in accordance with the identifying information comprises:
obtaining a content fingerprint in accordance with the portion of the media content item; and
identifying the media content item from among the plurality of media content items in accordance with the content fingerprint.

5. The method of claim 1, further comprising:
identifying an additional URL where a portion of the media content item is predicted to be available within the predefined time period or is presently available; and
in accordance with a determination that the portion of the media content item is less than a threshold amount,
forgoing creating a bookmark corresponding to the additional URL.

6. The method of claim 1, wherein the one or more predefined criteria further include one or more of:
quality associated with the media content item to be available at the first URL, and
cost or speed associated with accessing the media content item at the first URL.

7. The method of claim 1, further comprising:
after creating the provisional bookmark,
automatically performing a resolution operation to determine whether the media content item is available online in accordance with the provisional bookmark;
in accordance with a determination that the media content item has not yet become available online, after expiration of the predefined time period:
marking the provisional bookmark as invalid; and
transmitting to the electronic device a message instructing the electronic device to remove the provisional bookmark.

8. The method of claim 1, further comprising:
after creating the provisional bookmark,
automatically performing a resolution operation to determine whether the media content item is available online in accordance with the provisional bookmark;
in accordance with a determination that the media content item has become available online, before expiration of the predefined time period:
converting the provisional bookmark into a non-provisional bookmark; and transmitting to the electronic device a message instructing the electronic device to replace the provisional bookmark with the non-provisional bookmark.

9. The method of claim 8, further comprising:
after the provisional bookmark is converted into a non-provisional bookmark, automatically identifying one or more alternate URLs where the media content item is available online; and
redirecting the non-provisional bookmark to the one or more an alternate URLs.

10. The method of claim 1, wherein the information corresponding to the media content item is obtained from media content promoting the media content item.

11. A computing system, comprising:
at least one processor;
memory; and
at least one program stored in the memory and executable by the at least one processor, the at least one program comprising instructions to:
obtain from an electronic device identifying information corresponding to a media content item being presented on a television associated with the electronic device,
wherein the identifying information includes: (i) a portion of the media content item, or (ii) a fingerprint of the media content item;
identify the media content item in accordance with the obtained identifying information;
based on identification of the media content item, obtaining one or more URLs of web pages where the media content item is not yet currently available but is predicted to be available within a predefined future time period; and
create a provisional bookmark corresponding to a first URL of the one or more URLs, wherein the first URL is selected from among the one or more URLs in accordance with one or more predefined criteria, including whether the first URL belongs to an official or authorized provider of the media content item; and
transmit the provisional bookmark to the electronic device.

12. The system of claim 11, wherein the identifying information corresponding to the media content item is electronic program guide (EPG) information identifying the media content item.

13. The system of claim 11, wherein,
when the identifying information corresponding to the media content item is a portion of the media content item, identifying the media content item in accordance with the identifying information comprises:
obtaining a content fingerprint in accordance with the portion of the media content item; and
identifying the media content item from among the plurality of media content items in accordance with the content fingerprint.

14. The system of claim 11, wherein the at least one program further comprises instructions to:
after creating the provisional bookmark,
automatically perform a resolution operation to determine whether the media content item is available online in accordance with the provisional bookmark;
in accordance with a determination that the media content item has not yet become available online, after expiration of the predefined time period:
mark the provisional bookmark as invalid; and
transmit to the electronic device a message instructing the electronic device to remove the provisional bookmark.

15. The system of claim 11, wherein the at least one program further comprises instructions to:
- after creating the provisional bookmark, automatically perform a resolution operation to determine whether the media content item is available online in accordance with the provisional bookmark;
- in accordance with a determination that the media content item has become available online, before expiration of the predefined time period:
- convert the provisional bookmark into a non-provisional bookmark; and
- transmit to the electronic device a message instructing the electronic device to replace the provisional bookmark with the non-provisional bookmark.

16. A non-transitory computer readable storage medium storing at least one program configured for execution by at least one processor of a computer system, the at least one program comprises instructions to:
- obtain from an electronic device identifying information corresponding to a media content item being presented on a television associated with the electronic device, wherein the identifying information includes: (i) a portion of the media content item, or (ii) a fingerprint of the media content item;
- identify the media content item in accordance with the obtained identifying information;
- based on identification of the media content item, obtaining one or more URLs of web pages where the media content item is not currently available but is predicted to be available within a predefined future time period; and
- create a provisional bookmark corresponding to a first URL of one or more URLs, wherein the first URL is selected from among the one or more URLs in accordance with one or more predefined criteria, including whether the first URL belongs to an official or authorized provider of the media content item; and
- transmit the provisional bookmark to the electronic device.

17. The computer readable storage medium of claim 16, wherein the identifying information corresponding to the media content item is electronic program guide (EPG) information identifying the media content item.

18. The computer readable storage medium of claim 16, wherein, when the identifying information corresponding to the media content item is a portion of the media content item,
- identifying the media content item in accordance with the identifying information comprises:
- obtaining a content fingerprint in accordance with the portion of the media content item; and
- identifying the media content item from among the plurality of media content items in accordance with the content fingerprint.

19. The computer readable storage medium of claim 16, wherein the at least one program further comprises instructions to:
- after creating the provisional bookmark, automatically perform a resolution operation to determine whether the media content item is available online in accordance with the provisional bookmark;
- in accordance with a determination that the media content item has not yet become available online, after expiration of the predefined time period:
- mark the provisional bookmark as invalid; and
- transmit to the electronic device a message instructing the electronic device to remove the provisional bookmark.

20. The computer readable storage medium of claim 16, wherein the at least one program further comprises instructions to:
- after creating the provisional bookmark, automatically perform a resolution operation to determine whether the media content item is available online in accordance with the provisional bookmark;
- in accordance with a determination that the media content item has become available online, before expiration of the predefined time period:
- convert the provisional bookmark into a non-provisional bookmark; and
- transmit to the electronic device a message instructing the electronic device to replace the provisional bookmark with the non-provisional bookmark.

\* \* \* \* \*